US012656924B2

(12) United States Patent　　　　(10) Patent No.: US 12,656,924 B2

Iliffe-Moon　　　　　　　　　　　(45) Date of Patent: Jun. 16, 2026

(54) METHOD FOR OPERATING A USER INTERFACE WITH A DEFORMABLE TOUCH SENSITIVE DISPLAY DEVICE FOR A VEHICLE, DATA PROCESSING DEVICE, USER INTERFACE, VEHICLE AND COMPUTER PROGRAM AND/OR COMPUTER-READABLE STORAGE MEDIUM

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 36 days.

(21) Appl. No.: 18/508,161

(22) Filed: Nov. 13, 2023

(65) Prior Publication Data

US 2024/0168595 A1　　May 23, 2024

(30) Foreign Application Priority Data

Nov. 17, 2022　　(DE) ..................... 10 2022 130 495.7

(51) Int. Cl.
*G06F 3/044*　　　(2006.01)
*B60K 35/10*　　　(2024.01)
*B60K 35/65*　　　(2024.01)

*B60W 40/08*　　　(2012.01)
*B60W 50/14*　　　(2020.01)

(52) U.S. Cl.
CPC ............ *G06F 3/0447* (2019.05); *B60K 35/65* (2024.01); *B60W 40/08* (2013.01); *B60W 50/14* (2013.01); *B60K 35/10* (2024.01); *B60K 2360/1438* (2024.01); *B60W 2050/146* (2013.01); *B60W 2540/043* (2020.02)

(58) Field of Classification Search
CPC ....... G06F 3/0447; B60K 35/00; B60K 35/65; B60K 35/10; B60K 2360/1438; B60W 40/08; B60W 50/14; B60W 2540/043
See application file for complete search history.

(56) References Cited

U.S. PATENT DOCUMENTS

2020/0103021 A1* 4/2020 Eichhorn ................ F16H 63/50
2021/0206266 A1* 7/2021 Shim ..................... B60K 35/60

* cited by examiner

*Primary Examiner* — Kenneth B Lee, Jr.

(74) *Attorney, Agent, or Firm* — Maginot, Moore & Beck LLP

(57)　　　　　ABSTRACT

A method operates a user interface with a deformable touch sensitive display device for a vehicle. The method includes acquiring user input and determining user-related information based on the user input. The method also includes outputting, based on the user-related information, an actuation signal to conditionally drive an actuation device to physically deform the display device to transition from a first display state into a second display state that is different from the first display state.

20 Claims, 2 Drawing Sheets

METHOD FOR OPERATING A USER INTERFACE WITH A DEFORMABLE TOUCH SENSITIVE DISPLAY DEVICE FOR A VEHICLE, DATA PROCESSING DEVICE, USER INTERFACE, VEHICLE AND COMPUTER PROGRAM AND/OR COMPUTER-READABLE STORAGE MEDIUM

This application claims priority to German Patent Application No. 102022130495.7 filed on Nov. 17, 2022, the disclosure of which is incorporated in its entirety by reference herein.

TECHNICAL FIELD

The present disclosure relates generally to vehicles, and more specifically, to operating a user interface with a deformable touch sensitive display device for a vehicle.

BACKGROUND

User interfaces for vehicles are known in the prior art. Such a vehicle may be a product with many complex capabilities that are potentially available to any user, which brings both safety and security concerns along with possibilities to create new user experiences that may be personalized for different users. There are a number of challenges to controlling and personalizing user access for security and personalization. These challenges may comprise an identification of a user, i.e., understanding who a person is or uniquely distinguishing one person from another, an authentication, i.e., verifying the identity of a person, and an authorization, i.e., determining the access or access level to vehicle functions and features. The access or access level may influence a functioning of the user interface, i.e., the user interface may provide an output of content and/or respond to a user input, depending on the access level.

For example, one or more users may be grouped in one of the following groups: the primary driver (e.g. owner), a secondary driver (e.g. spouse of the owner), a limited access driver (e.g. teenager, valet parking driver, service driver, etc.) and a no access driver (underage child not permitted to drive, thief, drunk, etc.). However, according to the prior art, access to the vehicle is granted by keys. Those keys may allow complete access to the vehicle. Each of the identification, authentication and authorization is controlled only by the person that holds the key. For example, a teenage, valet parking assistant and underage child—all theoretically could drive the vehicle with no limitations, exactly as a primary driver. When a person picks up a vehicle key and enters the vehicle, a power button, a gear and drive mode selector, and generally all controls in the vehicle appear the same to any person, irrespective of whether they are authorized to use the vehicle.

However, there are different technologies that enable the identification, authentication and authorization of different users, and enable dynamic control of the vehicle features and functions that they have access to.

It is known in the prior art that a touch screen may be used as a user interface. For example, the touch screen may be used as a digital drive mode selector so that a swipe gesture on the touch screen enables the drive mode to be enabled and the vehicle to be activated. This swipe gesture is very similar to the gesture of unlocking or powering off a mobile phone—which is something any child can do, but password protection may prevent using the phone. The feature to activate the vehicle, however, functions without a password. Conceivably, any person may activate the vehicle and/or use the drive mode selector.

A user interface with a deformable touch sensitive display device for a vehicle is known from DE 10 2022 123 806. Therein, the user interface comprises a touch sensitive display device adapted to receive user input and adapted to display visibly perceivable output at a display surface, and an actuation device being arranged to be covered by the display surface and being adapted to physically deform the display device to reversibly transition from a first display state into a second display state different from the first display state. Therein, there is a focus on the articulation of an adaptive and/or conformable 3D touchscreen for user interaction purposes in the vehicle, specifically for a drive mode selector, e.g., for an electric vehicle.

It is an object of the present disclosure to provide an improved user interface.

SUMMARY

The above-stated object, as well as others, are achieved by at least some embodiments discussed herein.

One or more particular embodiments of the present disclosure may solve the object of providing a versatile user interface which may be able to provide a user-dependent differentiation between different scenarios for controlling the user interface.

According to an aspect of the disclosure, a method for operating a user interface with a deformable touch sensitive display device for a vehicle is provided. The method comprises: acquiring user input; determining a user-related information based on the user input; and outputting, based on the user-related information, an actuation signal to conditionally drive an actuation device to physically deform the display device to transition from a first display state into a second display state being different from the first display state.

Therein, the touch sensitive display device may be adapted to adapted to display visibly perceivable output at a display surface. The touch sensitive display device comprises an actuation device being arranged to be covered by the display surface and being adapted to physically deform the display device to reversibly transition from the first display state into the second display state.

Therein, the user input may be acquired to obtain information that may relate to the person of user which may use the user interface and/or the vehicle. E.g. the user input may determine the person of the user. The user input may be obtained by a dedicated action of the user to perform the input and/or automatically by the vehicle. The user input may allow a user-dependent, i.e., user-specific, output by and control of the user interface. Based on the user input, the user-related information may be determined. The user-related information may relate to modalities of functioning and/or controlling the user interface. The user-related information may be determined to output the actuation signal. The actuation signal may be output to deform the display device. The deformation of the display device may be perceivable by the user. Thus, the deformation may be perceived by the user in response to the determination of the person of the user and the corresponding modalities of functioning and/or controlling the user interface. The deformation of the display device may provide user feedback to enable the user to quickly and intuitively understand what access, access level or which features and functions the user has access to.

The user-related information may comprise an identification information. In this embodiment, from the user input, it may be determined who the user is, i.e., the person of the user may be determined. The identification information may lead to different levels of access, i.e., modalities of functioning and/or controlling the user interface, and may thus influence outputting the actuation signal. Alternatively or additionally, the user-related information may comprise an authentication information. In this embodiment, based on the user input, the identity of the user may be verified and/or confirmed. Alternatively or additionally, the user-related information may comprise an authorization information. In this embodiment, from the user input, the level of access is determined to control outputting the actuation signal.

In the first state, the display device may comprise a protruding section and/or a recessed section. The protruding section and/or the recessed section may be defined by an extension of the display device perpendicular to respect to a two-dimensional reference plane of the display device. Thus, in the first display state, the display device may provide a three-dimensionally extended and/or shaped surface.

In the first state, the display device may comprise a protruding section, wherein the protruding section may display a prompting for receiving further user input. In this embodiment, the protruding section displays the prompting for prominently providing an input request for further input by the user. In this embodiment, the protruding section may appear as a knob.

In the first state, the display device may be adapted to display a user-specific output at a display section of the display device. The user-specific output may provide an information for the user to provide user input to further grant access to the user interface.

The method may comprise the step of determining, based on the user-related information, a user-specific input capability for acquiring further user input. Therein, the user information may define which feature and/or function of the user interface and/or of the vehicle a specific user or group of users is capable to control by performing further user input. Thus, the user-specific input capability may limit and/or control the evaluation of further user input.

A condition to drive the actuation device may depend on the user-related information. Therein, the actuation device may be driven, depending on, for example, the identification information, the authentication information and/or the authorization information. This may allow driving the actuation device based on who the user is and/or which level of access is granted to the user.

The above may be summarized in other words and related to a non-limiting embodiment of the disclosure as follows: The disclosure relates to an adaptive 3D touchscreen authentication user interface. This disclosure focuses on how the access or access levels are presented to the user and/or are personalized for specific users. The disclosure focuses on a user interface that incorporates an adaptive 3D touchscreen that responds to the identity and/or authentication of the user and offers different user interaction possibilities according to different user access levels, user identities or user specific personalized settings.

The mode of response may include: a response or no-response; the adaption of the physical shape, displacement, e.g., negative, positive, convex and/or concave, and time-based motion of the 3D touchscreen; the zone (area or partial area) of the 3D touchscreen that is affected; the adaption of the GUI displayed on the 3D touchscreen; and the adaption of any sensory feedback, e.g., haptic, audio, lighting, scent.

For example, in the USA, a teenage learner driver (under a certain age) must only drive with an adult and cannot travel alone and/or with passengers. The uncontrolled access to a vehicle or specific vehicle functions/features, may have critical consequences or be of concern to the primary driver. For example, having implications such as safety, privacy, legal liability, theft, accidental damage, etc. The Drive Mode Selector and/or start button, which may be combined in one control point, is the gateway to the vehicle experience and functionality, and could be one example of a specific output method of the system.

One concept is related to the authorization step and user interface (system output) aspects. The authorization or permission rights may be set by the owner or driver, depending on whether they have control to do so (e.g. the owner would have master controls over who could access what features). The system may have certain presets (e.g. full rights vs. partial rights; e.g. driver rights vs. valet/service driver rights; etc.) and/or allow customization of very specific features (e.g. top speed, speed warning, sport mode, interior camera, audio volume). For example, control may be made via an app, web portal, cloud, etc., or set in the vehicle.

The system evaluates the identification and authentication to determine the authorization level of the user. According to the scenario (e.g. user flow, use case or user journey), the user interface is adapted accordingly. The adaption includes the physical adaption of the 3D touchscreen combined with the GUI. The behavior of the adaption can exist as changes between different physical or static states (e.g. a simple transition between an on to off state of a button, when the button is pressed or there is a change in system state) or a more continuous dynamic behavior (e.g. the system is waiting/requesting an user input (start engine/EV, etc.) or providing user feedback on the status of an action/event (e.g. suspension height adjustment that takes time to articulate/activate, etc.) whereby the 3D touchscreen articulates cyclically (e.g. 2 or more cycles repeated over a period of time (e.g. approx. 1 to 3 secs, etc.). The articulation of the 3D touchscreen would be coordinated with the GUI—such that that the GUI characteristics (e.g. text and graphics; e.g. icons, color, pattern/texture, etc.) change over time as necessary and as part of the GUI.

The system may provide an approach for customization of vehicle features/functions and how they are displayed on an adaptive 3D display and/or generally within the vehicle user interfaces and GUI. The graphical characteristics of the GUI may be manipulated to simulate 3-dimensionality, e.g. using shading to simulate the effects of light, such as highlights, shadows and material effects (transparency, reflectivity, glow/illumination, etc.). The simulation of a 3-dimensional interface via a GUI may be applied to areas of the display that are not 3-dimensional and/or not articulated (e.g. the effect may be applied to a conventional 2D display being flat or curved in one direction), touchscreen or display, such that the overall appearance of the digital experience in the vehicle cabin shares a similar visual design or appearance (assuming that the cabin digital experience may consist of adaptive 3D touchscreens and conventional touchscreens/displays).

A system may take sensor or data inputs to recognize and identify a potential user and/or to evaluate the authentication of the user and determine access control to the vehicle aspects. Access control may be enabled by an adaptive 3D Drive Mode Selector (e.g.) or other means related to the vehicle hardware and/or software (e.g. conventional touchscreen, door handle, etc.). The sensor or data input for example may comprise of e.g. RGB camera, fingerprint reader, smartphone authentication (e.g. UWB based smart access, smartphone pairing/connection (e.g. BlueTooth/BLE, UWB, NFC, etc.), vehicle sensors (e.g. seat sensor, etc.), keyfob (e.g. in combination with above). The system authenticates the user and determines the level of access control (e.g. full, partial, limited, no control). This process may work in conjunction with the user profile associated with each user (e.g. as determined by the keyfob, smartphone app or settings previously setup by the user (e.g. in the vehicle or remotely (e.g. by app or web interface).

The system determines the type or level of access and optionally or additionally determines the profile settings/preferences for that user's vehicle(s), present and future. The system is relevant also for users that may travel as passengers—allowing access to the vehicle, or specific functionality/features and customization of personal profile settings/preferences. Optionally or additionally, this approach is cloud connected and works across multiple vehicles and/or on-demand mobility services, irrespective of whether the user is the driver or passenger. An output of the system could be the control of an adaptive 3D Drive Mode Selector, optionally or additionally this access control may be combined with any other aspect of the vehicle. The output may not be limited to a 3D display, but may also apply to any conventional touchscreen or user input/interaction device or affordance. Examples for implementing are: A system that according to the identification, authentication and authorization process determines the output to the user interface. The user interface comprises of one or more adaptive 3D touchscreen or a touchscreen with one or more partial areas/regions of the touchscreen are 3D adaptive. The user interface may include a multi-sensory approach incorporating user feedback via 3D touchscreen, GUI, haptics, audio, etc. The primary user input modality to the system is via the touchscreen (3D and/or 2D) but remote input may also be provided (e.g. hover, proximal non-contact, mid-air gesture, remote control, physical buttons/knobs or touchpoints, etc.

The owner or driver may set authorization permissions or permissions may be preset for certain user types, e.g., teenager, learner driver, regular driver, guest driver, service/valet driver. The owner or driver may be able to personalize aspects of the user interface, e.g., contextual functionality or features; behavior of the 3D touchscreen and/or GUI; user feedback (e.g. 3D touchscreen, GUI, haptics, audio). Control of the authorization permissions may be via the vehicle, app (mobile device, wearable, smartphone, etc.), website, etc., and additionally may incorporate a cloud connected approach or direct communication with the vehicle. The system may respond to user input or be configured according to the state of the vehicle (e.g. before, during, after a drive or journey; e.g. initial or transitional state prior to or after user input). The adaptive 3D touchscreen and GUI are synchronized according to the authorization of the user. The physical behavior of the adaptive touchscreen may involve transitions between states or dynamic states (e.g. cyclical movement/motion of the full or partial areas of the 3D touchscreen) under different circumstance the adaptive 3D touchscreen may change in coordination with the GUI or independently to the GUI.

Another aspect of the disclosure relates to a data processing device. The data processing device is adapted to perform the method as described above. Therein, the data processing device may be adapted to perform optional steps and/or features of the method as described above to achieve a technical effect associated therewith.

Another aspect of the disclosure relates to a user interface. The user interface comprising a deformable touch sensitive display device, an actuation device and the data processing device as described above. Therein, the user interface may be adapted to perform optional steps and/or features of the method as described above to achieve a technical effect associated therewith.

Another aspect of the disclosure relates to a vehicle. The vehicle comprises the user interface as described above and/or the data processing device as described above. The user interface and/or the data processing device may comprise features as described above to achieve a technical effect associated therewith.

Another aspect of the disclosure relates to a computer program and/or computer-readable storage medium, comprising instructions, which, when the program is respectively the instruction are executed by a computer, cause the computer to carry out the method and/or the steps of the method as described above. The computer program and/or computer-readable storage medium may comprise instructions, which, when the program is respectively the instruction are executed by a computer, cause the computer to carry out optional features and/or the steps of the method as described above to achieve a technical effect associated therewith.

In the following, embodiments of the disclosure will be described with reference to the Figures.

DETAILED DESCRIPTION

Figure 1:
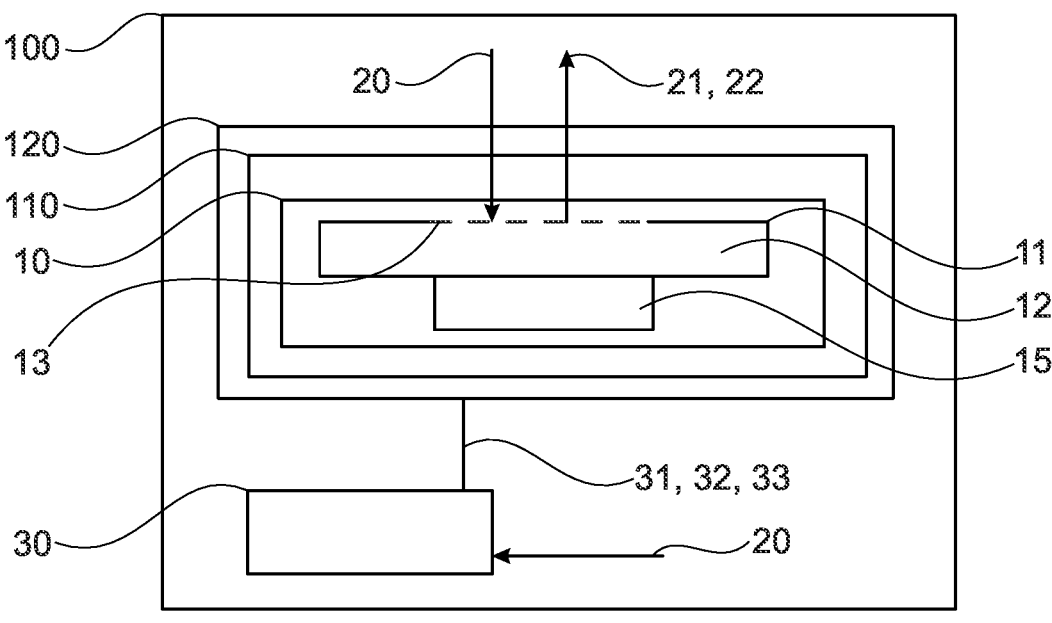
FIG. 1 shows a schematic overview of a vehicle according to an aspect of the disclosure.

FIG. 1 shows a schematic overview of a vehicle 100 according to an aspect of the disclosure.

The vehicle 100 comprises a steering wheel 120 and a data processing device 30. The steering wheel 120 comprises a drive mode selector 110 for a vehicle 100. The drive mode selector 110 is arranged at the steering wheel 120.

The drive mode selector 110 comprises a user interface 10. In another embodiment, the user interface 10 may be arranged elsewhere in and/or at the vehicle 100. The user interface 10 and authentication and access control to the user interface 10 may be applied beyond the drive mode selector 110 and may be applied to all aspects of the vehicle 100, e.g., hardware, software, services; examples of the many different aspects include: maximum speed, acceleration profile, media source, media rating (clean vs. explicit media), audio volume, door controls, glovebox access. The user interface 10 as shown in FIG. 1 comprises a touch sensitive display device 12 adapted to receive user input 20 and adapted to display visibly perceivable output 21 at a display surface 11. The user interface 10 further comprises an actuation device 15 being arranged to be covered by the display surface 11.

The user interface 10 and the data processing device 30 are connected to each other so that the user interface 10 may transmit a control signal 31 to the data processing device 30 and/or so that the user interface 10 may receive a control signal 31 from the data processing device 30. The control signal 31 being transmitted from the user interface 10 may relate to the user input 20. The control signal 31 being received by the user interface 10 may relate to the output 21. The data processing device 30 is adapted to output an actuation signal 33 to the user interface 10 to control the actuation device 15.

The data processing device 30 is adapted to acquire user input 20. The user input 20, as explained above, may be input actively by the user through the user interface 10. Additionally, the user input 20 is acquired automatically without an explicit input and/or action by the user. Therein, the data processing device 30 is connected and/or connectable to a sensor device and/or an external device, such as a user terminal device and/or a key. The sensor or data input for example may comprise of e.g. RGB camera, fingerprint reader, smartphone authentication, e.g., UWB-based smart access, smartphone pairing/connection, e.g. BlueTooth/ BLE, UWB and/or NFC, vehicle sensors, e.g., seat sensor, keyfob, e.g., in combination with one of the aforementioned input sources.

The data processing unit 30 is adapted to determine a user-related information 32 based on the user input 20. The user-related information 32 comprises an identification information, an authentication information and an authorization information. Thus, the data processing device 30 acquires the user-related information 32, to recognize and identify a potential user, to evaluate the authentication of the user and determine access control to the user interface 10. Therein, the access control may enable the user the use an adaptive 3D Drive Mode Selector or other devices related to the vehicle hardware and/or software. The data processing device 30 authenticates the user and determines the level of access control, e.g. full, partial, limited or no control. This process may work in conjunction with a user profile associated with each user. The data processing device 30 determines the type or level of access and optionally or additionally determines the profile settings and/or preferences for the vehicle 200. The data processing device 30 is adapted to distinguish users amongst a plurality of users that may travel as passengers, allowing access to the vehicle 200, or a specific functionality and/or a feature, customization of personal profile settings and/or preferences. The data processing device 30 may be connected to an external server (not shown), i.e., a cloud may be connected and work across multiple vehicles 200 and/or on-demand mobility services, irrespective of whether the user is the driver or passenger.

Figures 2, 3:
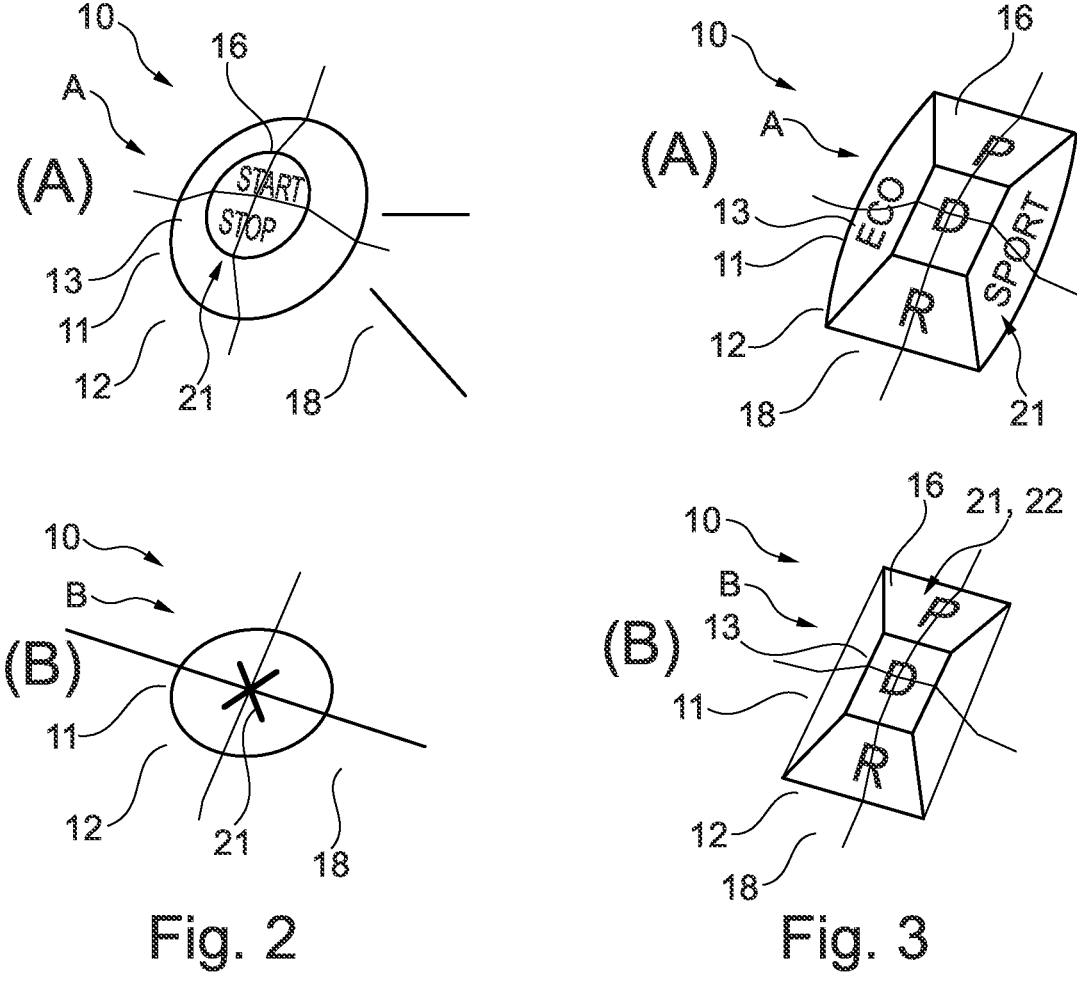
FIG. 2 shows a perspective view of a user interface according to an aspect of the disclosure in a first display state and in a second display state.
FIG. 3 shows a perspective view of a user interface according to an aspect of the disclosure in a first display state and in a second display state.

The data processing device 30 is adapted to, based on the user-related information 32, output an actuation signal 33 to conditionally drive the actuation device 15 to physically deform the display device 12 to transition from a first display state A into a second display state B being different from the first display state A (see FIGS. 2 and 3). A condition to drive the actuation device 15 depends on the user-related information 32. For example, if a user requests a function by a user input 20 for which the user has access to, the actuation device 15 is driven to present and/or emphasize output 21 by a protruding section 16 protruding towards the user. Otherwise, if the user requests a function by a user input 20 for which the user is not permitted, the actuation device 15 is driven to retract the display device 12, e.g., to present a recessed section and/or plane section of the display device 12. The control the user interface 10 accordingly, the data processing unit 30 is adapted to, based on the user-related information 32, determine a user-specific input capability for acquiring further user input 20.

The actuation device 15 comprises piezoelectric actuators, electromagnetically driven actuators and/or a shape-memory material. To perform an actuation, the actuation device 15 may be controlled by the control signal 31. The control signal 31 may cause a mechanical actuation of the piezoelectric actuators, may induce an electromagnetic force to cause a mechanical actuation of electromagnetically driven actuators and/or may trigger a deformation of the shape-memory material, e.g., by an electric current and/or a temperature change.

The actuation device 15 is adapted to physically deform the display device 12 to reversibly transition from a first display state A into a second display state B different from the first display state A as described with reference to FIGS. 2 and 3.

FIG. 2 shows a perspective view of a user interface 10 according to an aspect of the disclosure in a first display state A (see FIG. 2 (A)) and in a second display state B (see FIG. 2 (B)). The user interface 10 is already described with reference to FIG. 1. FIG. 2 is described under reference to FIG. 1.

The user interface 10 of FIG. 2 comprises a touch sensitive display device 12 adapted to receive user input 20 and adapted to display visibly perceivable output 21 at a display surface 11.

The user interface 10 comprises an actuation device 15 (not shown in FIG. 2) being arranged to be covered by the display surface 11 and being adapted to physically deform the display device 12 to reversibly transition from a first display state A into a second display state B different from the first display state A. The first display state A is shown in FIG. 2 (A) and the second display state B is shown in FIG. 2 (B).

In FIG. 2 (A), the display surface 11 comprises a section 13 of the display surface 11 with a protruding section 16. I.e., the actuation device 15 is adapted to deform the section 13 of the display surface 11.

The protruding section 16 protrudes from a reference plane 18. The protruding section 16 is shaped so that the display surface 11 comprises a convex shape with a plurality of facets, i.e., a front-facing facet and a circumferentially arranged facet. Each of the facets may related to a certain function, i.e., each of the facets shows a specific output 21 and may acquire, in reaction thereto, a specific user input 20. The specific output 21 may indicate that touching the protruding section 16 may, in dependence on authorization, may start the vehicle 100. In another embodiment (not shown), the display surface 11 may not be faceted and may comprise a smooth surface without defined edges. I.e., the display surface 11 may comprise a concave and/or convex surface of any shape.

The actuation device 15 is adapted to deform the display device 12 to obtain a plurality of states between the first display state A and the second display state B. I.e., the transition between the display states A, B as shown in FIGS. 2 (A) and 2 (B) may be performed by obtaining a plurality of intermediate states (not shown). Therein, the user interface 10 is adapted to perform a transition of the display device 12 from the first display state A to the second display state B in a continuous and/or discrete manner.

The user interface 10 is adapted to perform a transition of the display device 12 in dependence on the user input 20, on the output 21, on the user-related information, in particular the authorization information, and/or periodically. If a user provides a touch input as user input 20 to the start/stop function, e.g., taps, presses, long presses, multi-finger presses, touches and/or performs a gesture input, the display device 12 may, depending on the access level of the user, i.e., the authorization information, in combination with the articulation of the display surface 11, change, i.e., transition to the next state as shown in the second state B in FIG. 2 (B).

In FIG. 2 (B), the display surface 11 is flat, i.e., arranged in the reference surface 18. In this state, the display device 12 may be in a neutral shape or state; e.g. flat, curved, concave, convex; e.g. 2-dimensional or 3-dimensional. In the initial state the display device 12 may indicate that access for the function as being illustrated in FIG. 2 (A) is denied. Thus, the actuation device 15 may transition the display device 12 from the protruding configuration as shown in FIG. 2 (A) into the flat configuration as shown in FIG. 2 (B), if the user-related information 32, in particular the authorization information denies access to the requested function being provided by the user interface 10. Otherwise, if the user-related information 32, in particular the authorization information allows access to a specific function being provided by the user interface 10, the actuation device 15 may transition the display device 12 from the flat configuration as shown in FIG. 2 (B) into the protruding configuration as shown in FIG. 2 (A).

FIG. 3 shows a perspective view of a user interface 10 according to an aspect of the disclosure in a first display state A (see FIG. 3 (A)) and in a second display state B (see FIG. 3 (B)). The user interface 10 is already described with reference to FIG. 1. FIG. 3 is described under reference to FIGS. 1 and 2.

In the first state A, the display device 12 comprises a protruding section 16 and/or a recessed section 18. In the first state A, the display device 12 comprises a protruding section 16, wherein the protruding section 16 displays a prompt 22 for receiving further user input 20. The protruding section 16 is shaped so that the display surface 11 comprises a faceted shape with a plurality of facets. Each of the facets may related to a certain function, i.e., each of the facets shows a specific output 21 and may acquire, in reaction thereto, a specific user input 20. The protruding section 16 comprises a plurality of facets and each of the facets may display a prompting 22 for receiving further user input 20. In the first state A, the display device 12 is adapted to display a user-specific output 22 at a display section 13 of the display device 12. Therein, the user-specific output 22 may change due to the user-related information 32, in particular depending on the authorization information.

Figure 4:
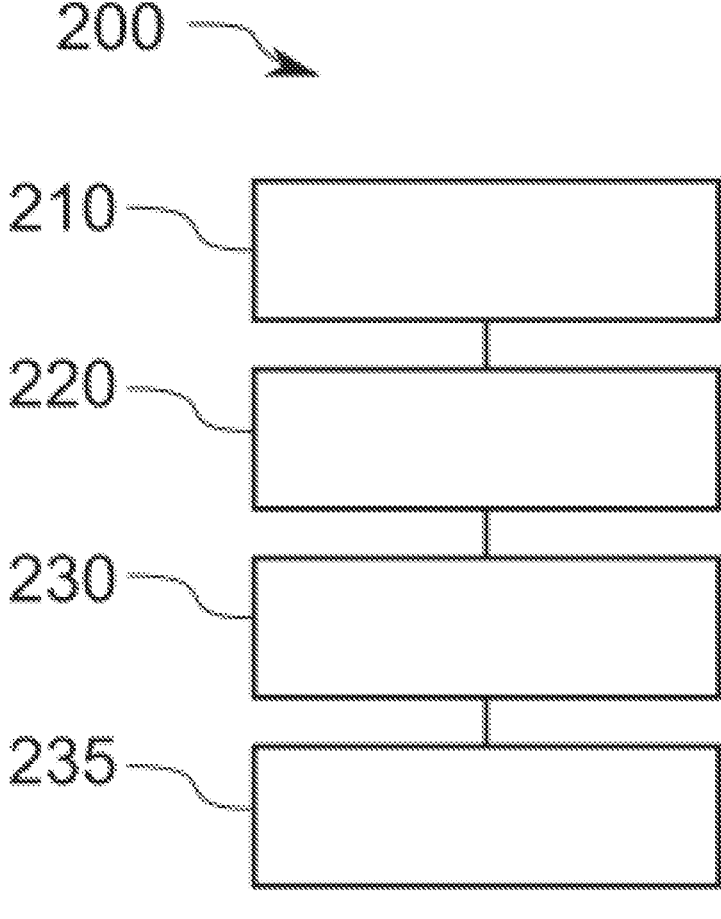
FIG. 4 shows a schematic flow diagram of a method according to an aspect of the disclosure.

FIG. 4 shows a schematic flow diagram of a method 200 according to an aspect of the disclosure. The method 200 is a method 200 for operating a user interface 10 with a deformable touch sensitive display device 12 for a vehicle 100. Such a vehicle 100 is described with reference to FIG. 1 and such a user interface 10 is described with reference to FIGS. 1 to 3. FIG. 4 is described under reference to FIGS. 1 to 3.

The method 200 comprises acquiring 210 user input 20.

The method 200 comprises determining 220 a user-related information 32 based on the user input 20. The user-related information 32 comprises an identification information, an authentication information and an authorization information.

The method 200 comprises outputting 230, based on the user-related information 32, an actuation signal 33 to conditionally drive an actuation device 15 to physically deform the display device 12 to transition from a first display state A into a second display state B being different from the first display state A. In the first state A, the display device 12 comprises a protruding section 16 and/or a recessed section 18. In the first state A, the display device 12 comprises a protruding section 16, wherein the protruding section 16 displays a prompting 22 for receiving further user input 20.

In the first state A, the display device 12 is adapted to display a user-specific output 22 at a display section 13 of the display device 12. A condition to drive the actuation device 15 depends on the user-related information 32.

The method 200 comprises determining 235, based on the user-related information 32, a user-specific input capability for acquiring further user input 20.

LIST OF REFERENCE SIGNS 10 user interface
11 display surface
12 display device
13 section
15 actuation device
16 protruding section
18 reference surface
20 user input
21 output
22 user-specific output
30 data processing device
31 control signal
32 user-related information
33 actuation signal
100 vehicle
200 method
210 acquiring
220 determine
230 output
235 determining
A first display state
B second display state

The invention claimed is:

1. A method for operating a user interface with a deformable touch sensitive display device for a vehicle, comprising
    acquiring user input;
    determining user-related information based on the user input; and
    outputting, based on the user-related information, an actuation signal to conditionally drive an actuation device to physically deform the display device to transition from a first display state into a second display state that is different from the first display state; and
    wherein the user-related information comprises at least one of the group consisting of identification information, authentication information, and authorization information.

2. The method as claimed in claim 1, wherein, in the first state, the display device comprises at least one of the group consisting of a protruding section and a recessed section, wherein the protruding section protrudes with reference to a section in a location of the protruding section in a state of the display device other than the first state, and the recessed section is recessed with reference to a section in a location of the recessed section in the state of the display device other than the first state.

3. The method as claimed in claim 2, wherein, in the first state, the protruding section displays a prompt for receiving further user input.

4. The method as claimed in claim 1, wherein, in the first state, the display device comprises a protruding section, the protruding section defining a plurality of facets, wherein each facet of the protruding section displays a different prompt for receiving further user input.

5. The method as claimed in claim 4, further comprising, in the first state, displaying a user-specific output at a display section of the display device.

6. The method as claimed in claim 1, further comprising, in the first state, displaying a user-specific output at a display section of the display device.

7. The method as claimed in claim 1, further comprising determining, based on the user-related information, a user-specific input capability for acquiring further user input.

8. The method as claimed in claim 1, wherein a condition to drive the actuation device depends on the user-related information.

9. A method for operating a user interface with a deformable touch sensitive display device for a vehicle, comprising acquiring user input;

determining user-related information based on the user input; and outputting, based on the user-related information, an actuation signal to conditionally drive an actuation device to physically deform the display device to transition from a first display state into a second display state that is different from the first display state; and wherein the display device defines a reference plane, and wherein, in the first state, the display device comprises a first section that protrudes from the reference plane further than the first section protrudes from the reference plane in the second state.

10. The method as claimed in claim 9, wherein the first section does not protrude from the reference plane in the second state.

11. The method as claimed in claim 9, wherein the user-related information comprises at least one of the group consisting of identification information, authentication information, and authorization information.

12. The method as claimed in claim 9, wherein, the first state, the protruding section displays a prompt for receiving further user input.

13. The method as claimed in claim 12, further comprising, in the first state, displaying a user-specific output at a display section of the display device.

14. A data processing device configured to perform the method as claimed in claim 1.

15. A user interface comprising a deformable touch sensitive display device, an actuation device and the data processing device as claimed in claim 14.

16. A vehicle, comprising the user interface as claimed in claim 15.

17. A non-transitory computer-readable storage medium, comprising instructions, which, when executed by a computer, cause the computer to carry out the method of claim 1.

18. The method as claimed in claim 1, wherein the actuation device is configured to cause the display to have a visible protruding section or a visible recessed section responsive to the actuation signal.

19. The method as claimed in claim 1, wherein the actuation device is configured to cause the display to have a deformed section having a prompt for receiving user input responsive to the actuation signal.

20. The method as claimed in claim 4, wherein the protruding section displays the different prompts for drive mode selection.

\* \* \* \* \*